United States Patent
Fujimori

(10) Patent No.: US 10,911,809 B2
(45) Date of Patent: Feb. 2, 2021

(54) COMMUNICATION APPARATUS, COMMUNICATION METHOD, AND PROGRAM

(71) Applicant: CANON KABUSHIKI KAISHA, Tokyo (JP)

(72) Inventor: Yuki Fujimori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 594 days.

(21) Appl. No.: 15/385,535

(22) Filed: Dec. 20, 2016

(65) Prior Publication Data

US 2017/0105034 A1 Apr. 13, 2017

Related U.S. Application Data

(63) Continuation of application No. PCT/JP2015/063447, filed on May 11, 2015.

(30) Foreign Application Priority Data

Jun. 23, 2014 (JP) .................. 2014-128353

(51) Int. Cl.
*H04N 21/262* (2011.01)
*H04N 21/63* (2011.01)
(Continued)

(52) U.S. Cl.
CPC ......... *H04N 21/26258* (2013.01); *G06T 7/73* (2017.01); *H04N 21/2187* (2013.01);
(Continued)

(58) Field of Classification Search
CPC ......... H04N 21/2387; H04N 21/47205; H04N 21/4825; H04N 21/631; H04N 21/84; H04N 21/8456; H04N 21/8586
See application file for complete search history.

(56) References Cited

U.S. PATENT DOCUMENTS

2001/0023436 A1* 9/2001 Srinivasan ........... H04N 21/812
709/219
2004/0062435 A1* 4/2004 Yamaoka ............. G06K 9/4609
382/159

(Continued)

FOREIGN PATENT DOCUMENTS

| JP | 2012-514276 A | 6/2012 |
|---|---|---|
| WO | 2014/057131 A1 | 4/2014 |
| WO | 2015/060349 A1 | 4/2015 |

OTHER PUBLICATIONS

Aditya Mavlankar, Piyush Agrawal, Derek Pang, Sherif Halawa, Ngai-Man Cheung, Bernd Girod, An Interactive Region-of-Interest Video Streaming System for Online Lecture Viewing, Proceedings of 2010 IEEE 18th International Packet Video Workshop, Dec. 13-14, 2010, pp. 64-71, Hong Kong, IEEE, Piscataway, NJ, 2010.

*Primary Examiner* — Thai Q Tran
*Assistant Examiner* — Sunghyoun Park
(74) *Attorney, Agent, or Firm* — Canon U.S.A., Inc. IP Division

(57) ABSTRACT

A transmission apparatus 101 divides an image into a plurality of image areas. In addition, the transmission apparatus 101 identifies one or a plurality of image areas corresponding to a position of a first object in the image. Next, the transmission apparatus 101 generates a segment corresponding to the one or plurality of image areas identified and a playlist in which a URL for accessing the segment is described. Next, the transmission apparatus 101 transmits the playlist in accordance with a request from the reception apparatus 102 and then, after the URL included in the playlist is accessed, transmits data regarding the segment whose address is indicated by the URL to the reception apparatus 102.

11 Claims, 11 Drawing Sheets

(51) Int. Cl.
  *H04N 21/472*    (2011.01)
  *H04N 21/2343*   (2011.01)
  *G06T 7/73*      (2017.01)
  *H04N 21/2187*   (2011.01)
  *H04N 21/2387*   (2011.01)
  *H04N 21/482*    (2011.01)
  *H04N 21/84*     (2011.01)
  *H04N 21/845*    (2011.01)
  *H04N 21/858*    (2011.01)

(52) U.S. Cl.
  CPC ..... *H04N 21/2343* (2013.01); *H04N 21/2387* (2013.01); *H04N 21/234327* (2013.01); *H04N 21/47205* (2013.01); *H04N 21/4825* (2013.01); *H04N 21/631* (2013.01); *H04N 21/84* (2013.01); *H04N 21/8456* (2013.01); *H04N 21/8586* (2013.01); *G06T 2207/10004* (2013.01)

(56) References Cited

U.S. PATENT DOCUMENTS

| | | | |
|---|---|---|---|
| 2004/0114218 A1* | 6/2004 | Karlsson | G02B 21/26 359/368 |
| 2006/0277457 A1* | 12/2006 | Salkind | G06F 16/958 715/234 |
| 2008/0320036 A1* | 12/2008 | Winter | G06F 16/58 |
| 2009/0009626 A1* | 1/2009 | Ko | H04N 1/00251 348/231.3 |
| 2011/0051808 A1* | 3/2011 | Quast | H04N 7/18 375/240.08 |
| 2013/0111028 A1* | 5/2013 | Kondrad | H04L 65/1016 709/225 |
| 2014/0089990 A1* | 3/2014 | van Deventer | H04N 21/4728 725/61 |
| 2014/0201335 A1* | 7/2014 | Wang | H04L 65/80 709/219 |
| 2014/0380194 A1* | 12/2014 | Kim | G06F 3/04842 715/753 |

* cited by examiner

FIG. 4

```
<?xml version="1.0"?>
<MPD>
 <BaseURL>http://www.example.com/</BaseURL>
 <Preiod>
  <AdaptationSet>
   <Representation id="1">
    <BaseURL>AllView.mp4</BaseURL>
   </Representation>
   <Representation id="2">
    <BaseURL>ObjectRecognized.mp4</BaseURL>
   </Representation>
   <Representation id="3">
    <BaseURL>ObjectA.mp4</BaseURL>
   </Representation>
   <Representation id="4">
    <BaseURL>ObjectB.mp4</BaseURL>
   </Representation>
   <Representation id="5">
    <BaseURL>ObjectC.mp4</BaseURL>
   </Representation>
  </AdaptationSet>
 </Period>
</MPD>
```

```
<?xml version="1.0"?>
<MPD>
 <BaseURL>http://www.example.com/</BaseURL>
 <Preiod>
  <AdaptationSet>
   <SegmentTemplate media="$RepresentationID$-$Number$.mp4"/>
   <Representation id="1"></Representation>
   <Representation id="2"></Representation>
   <Representation id="3"></Representation>
   <Representation id="4"></Representation>
   <Representation id="5"></Representation>
  </AdaptationSet>
 </Period>
</MPD>
```
501

FIG. 6

```
<?xml version="1.0"?>
<MPD>
 <BaseURL>http://www.example.com/</BaseURL>
 <Preiod>
  <AdaptationSet>
    <SegmentTemplate media="$RepresentationID$-$Number$.mp4"/>
    <Representation id="$ObjectID$"></Representation>
  </AdaptationSet>
 </Period>
</MPD>
```
601

COMMUNICATION APPARATUS, COMMUNICATION METHOD, AND PROGRAM

CROSS-REFERENCE TO RELATED APPLICATIONS

This application is a Continuation of International Patent Application No. PCT/JP2015/063447, filed May 11, 2015, which claims the benefit of Japanese Patent Application No. 2014-128353, filed Jun. 23, 2014, both of which are hereby incorporated by reference herein in their entirety.

TECHNICAL FIELD

The present invention relates to a communication apparatus, a communication method, and a program and, more particularly, to a technique for communication media data.

BACKGROUND ART

During these years, distribution systems that distribute streaming content (media data) configured by audio data, image data, or the like to users in real-time have been provided. The users can enjoy desired content such as live images using such distribution systems through their own terminal apparatuses.

With the spread of terminal apparatuses such as smartphones and tablets, there are growing demands for means for enjoying streaming content anytime, anywhere. In order to meet the demands, techniques (MPEG-DASH, Http Live Streaming, and the like) for dynamically changing streams obtained by terminal apparatuses in accordance with the performance of the terminal apparatuses or communication conditions under which the terminal apparatuses are used are attracting attention.

In such techniques, image data is divided into time-based segments. URLs (Uniform Resource Locators) indicating addresses of the segments are then described in a file called a playlist.

In a playlist, URLs corresponding to segments can be described. A reception apparatus obtains the playlist and then obtains desired image data (segment) using information (URL) described in the playlist (refer to PTL 1).

In PTL 1, a technique for causing a transmission apparatus and a reception apparatus to perform the following process is disclosed.

The transmission apparatus associates address information necessary for the reception apparatus to receive data regarding segments with the data regarding the segments. URIs (Uniform Resource Identifiers), for example, are associated with the segment data as the address information. The transmission apparatus then transmits, to the reception apparatus, meta-data (playlist) including a plurality of pieces of the address information associated with a plurality of pieces of the data regarding the segments in accordance with a request from the reception apparatus. The reception apparatus requests transmission of data regarding a segment on the basis of the address information included in the received playlist and receives the data regarding the segment from the transmission apparatus.

CITATION LIST

Patent Literature

PTL 1 PCT Japanese Translation Patent Publication No. 2012-514276

With the technique described in PTL 1, a reception apparatus can select and receive a desired one of a plurality of segments generated by temporally dividing image data. It is not, however, taken into consideration that the reception apparatus selects and receives a desired one of a plurality of segments generated by spatially dividing an image included in image data.

That is, a mechanism for communicating, among pieces of image data distributed from a transmission apparatus, one regarding an area selected by a reception apparatus when an image is communicated using a playlist has not been proposed.

The present invention has been established in view of the above problem and aims to enable a reception apparatus to request an area according to a position of an object when an image is communicated using a playlist.

SUMMARY OF INVENTION

A data processing apparatus in the present invention includes division means that divides an image into a plurality of image areas, first generation means that generates data according to one or a plurality of the image areas corresponding to a position of a first object in the image, second generation means that generates a playlist including obtaining information used by an external apparatus to obtain the data generated by the first generation means, and communication means that transmits, to the external apparatus, the playlist and the data requested by the external apparatus using the obtaining information included in the playlist.

Further features of the present invention will become apparent from the following description of exemplary embodiments with reference to the attached drawings.

BRIEF DESCRIPTION OF DRAWINGS

FIG. 4 is a diagram illustrating a first example of a playlist.

FIG. 5 is a diagram illustrating a second example of the playlist.

FIG. 6 is a diagram illustrating a third example of the playlist.

DESCRIPTION OF EMBODIMENTS

An embodiment of the present invention will be described in detail hereinafter with reference to the drawings.

Figure 1:
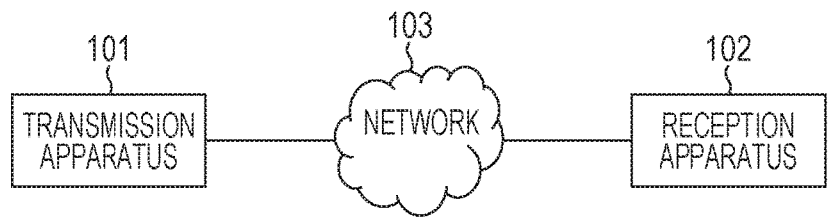
FIG. 1 is a diagram illustrating the overall configuration of a communication system.

FIG. 1 is a diagram illustrating an example of the overall configuration of a communication system.

A transmission apparatus 101 is a communication apparatus mutually connected with a reception apparatus 102 through a network 103. There may be a plurality of transmission apparatuses 101 and a plurality of reception apparatuses 102.

Specific examples of the transmission apparatus 101 include data processing apparatuses such as a camera apparatus, a video camera apparatus, a smartphone apparatus, a PC apparatus, and a mobile phone. The transmission apparatus 101, however, is not limited to one of these data processing apparatuses insofar as the transmission apparatus 101 has a functional configuration that will be described later.

The reception apparatus 102 has a function of playing back and displaying content, a communication function, and a function of receiving an input from a user. In addition, the reception apparatus 102 is a communication apparatus that receives various pieces of media data from the transmission apparatus 101, such as images and audio. Specific examples of the reception apparatus 102 include data processing apparatuses such as a smartphone apparatus, a PC apparatus, a television set, and a mobile phone. The reception apparatus 102, however, is not limited to one of these data processing apparatuses insofar as the reception apparatus 102 has the above-described functions.

The network 103 is a wired LAN (Local Area Network) or a wireless LAN as a home network. The network 103 is not limited to one of these. The network 103 may be, for example, a WAN (Wide Area Network), an ad hoc network, Bluetooth, Zigbee, UWB, or the like, instead.

Figure 2:
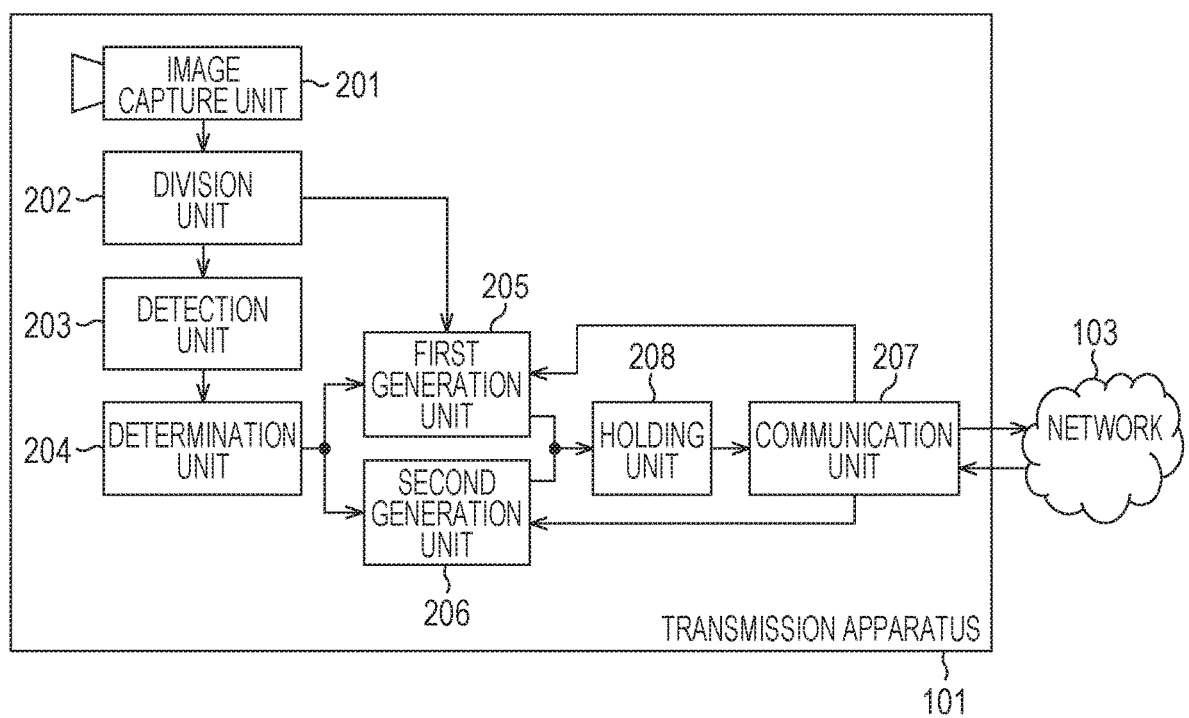
FIG. 2 is a diagram illustrating the functional configuration of a transmission apparatus.

FIG. 2 is a diagram illustrating an example of the functional configuration of the transmission apparatus 101.

An image capture unit 201 captures an image of a subject. In the present embodiment, the image capture unit 201 can capture moving images and still images. The image capture unit 201 may be provided outside the transmission apparatus 101. In this case, the transmission apparatus 101 obtains image data obtained by the external image capture unit 201.

A division unit 202 divides an area of one screen included in image data into a plurality of image areas. The division unit 202 then encodes each of image areas of the image data obtained as a result of the division. Any method for encoding image data, such as HEVC (High Efficiency Video Coding), may be used insofar as image data can be divided into a plurality of image areas.

In the present embodiment, the division unit 202 generates a plurality of pieces of data having a hierarchical structure from data regarding one screen included in image data. In the present embodiment, the division unit 202 generates data regarding a base layer and data regarding an enhancement layer on the basis of data regarding one screen.

Here, the data regarding a base layer is data on the basis of which the reception apparatus 102 plays back an image of one screen. For example, the data regarding a base layer is data regarding an image whose image quality is the lowest (e.g., resolution is the lowest) in image data transmitted from the transmission apparatus 101 to the reception apparatus 102.

The data regarding an enhancement layer is data used by the reception apparatus 102 to play back an image whose image quality is higher (e.g., resolution is higher) than when the reception apparatus 102 plays back only the data regarding a base layer. By obtaining and playing back data regarding an enhancement layer along with data regarding a base layer, the reception apparatus 102 can play back an image whose image quality is higher than when the reception apparatus 102 plays back only the data regarding a base layer.

In the present embodiment, the reception apparatus 102 can obtain data regarding an enhancement layer in each partial area of one screen. Each partial area corresponds to each of image areas obtained by dividing one screen using the division unit 202. By obtaining data regarding an enhancement layer in an image area corresponding to a Region Of Interest (hereinafter referred to as a ROI) in one screen, the reception apparatus 102 can generate image data in which the image quality of the ROI is higher than that of other areas.

Although a case in which data regarding one base layer and data regarding one enhancement layer are generated for one screen will be described in the present embodiment, the number of layers is not limited to this. For example, data regarding one base layer and data regarding a plurality of enhancement layers may be generated, instead.

A detection unit 203 detects an object that can be a ROI (Region Of Interest) shown in image data. The detection unit 203 is capable of simultaneously detecting a plurality of objects shown in image data and detecting positional information (coordinates and sizes) regarding the plurality of objects shown in the image data.

The detection unit 203 may be provided outside the transmission apparatus 101. In this case, the transmission apparatus 101 obtains positional information regarding an object detected by the external detection unit 203.

A determination unit 204 determines, using positional information regarding an object detected by the detection unit 203, whether each of image areas obtained as a result of division performed by the division unit 202 is an image area including an object.

A first generation unit 205 generates segments of image data regarding each of image areas determined by the determination unit 204 to include objects and the entirety of an image. The transmission apparatus 101 according to the present embodiment generates segments by spatially (into areas) dividing one screen (image) included in image data.

In the present embodiment, the first generation unit 205 generates a segment on the basis of data regarding a base layer. In addition, in the present embodiment, the first generation unit 205 generates one or a plurality of segments on the basis of data regarding a part or the entirety of an enhancement layer. The first generation unit 205 also associates the generated segments with identifiers.

A second generation unit 206 generates a playlist at each of times at which image data has been obtained. A playlist stores obtaining information used by an external apparatus to obtain segments of image data created by the first generation unit 205, the obtaining information being mutually associated with identifiers of objects included in the segments. The obtaining information is, for example, resource identifiers (e.g., URIs or URLs) indicating addresses of the segments created by the first generation unit 205. Any resource identifiers may be used insofar as the resource identifiers are used by the reception apparatus 102, which is an external apparatus, to obtain desired segments. Segments need not necessarily be stored in storage areas indicated by resource identifiers described in a playlist. For example, a first storage area indicated by a resource identifier described in a playlist may include a link to a second storage area storing a segment, in order to enable the reception information 102 to go to the second area and obtain segment data when the reception apparatus 102 accesses the first storage area using the resource identifier.

A holding unit 208 holds data regarding segments generated by the first generation unit 205. In addition, the holding unit 208 holds playlists generated by the second generation unit 206. The holding unit may be, for example, a RAM (Random Access Memory), a ROM (Read Only Memory), or the like. Alternatively, the holding unit may be an external recording device.

A communication unit 207 transmits a playlist generated by the second generation unit 206 and held by the holding unit 208 to the reception apparatus 102 through the network 103 in accordance with a request from the reception apparatus 102. In addition, the communication unit 207 transmits a segment generated by the first generation unit 205 and held by the holding unit 208 to the reception apparatus 102 through the network 103 in accordance with a request from the reception apparatus 102. In the present embodiment, the communication unit 207 performs streaming distribution of data regarding segments generated by the first generation unit 205.

Figure 3A:
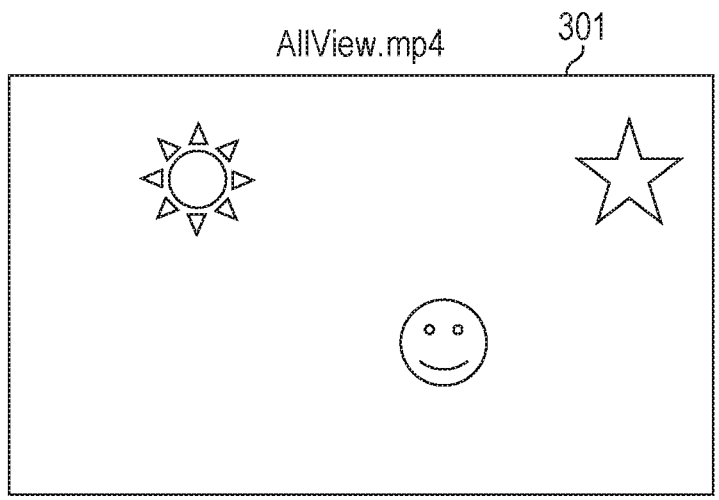
FIGS. 3A and 3B are diagrams illustrating a method for determining image areas including objects.
Figure 3B:
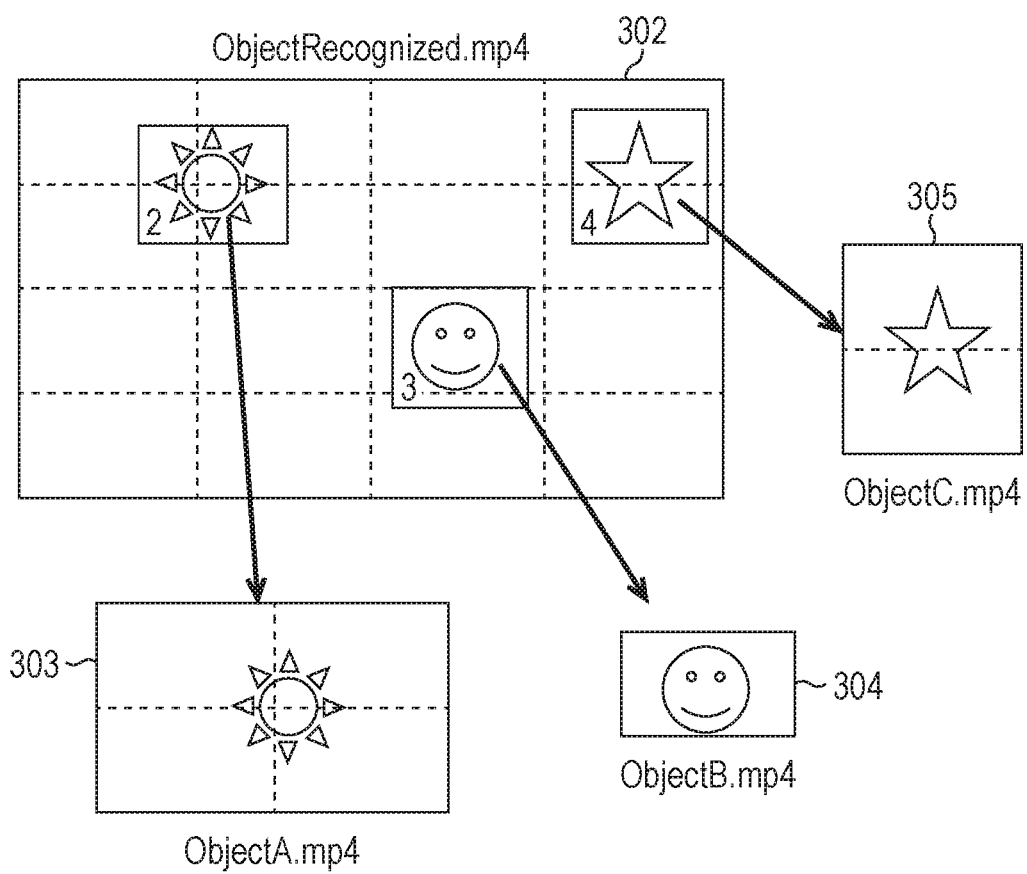

FIGS. 3A and 3B are diagrams illustrating an example of a method for determining image areas including objects.

An example of a process performed by the detection unit 203, the determination unit 204, and the first generation unit 205 will be described with reference to FIGS. 3A and 3B.

In the present embodiment, a case will be described in which the reception apparatus 102 generates data regarding a base layer and data regarding an enhancement layer from data regarding one screen.

FIG. 3A is a diagram illustrating an example of the data regarding a base layer. In the present embodiment, the first generation unit 205 generates a segment 301 corresponding to data regarding an area of the entirety of a base layer. In the present embodiment, the first generation unit 205 associates the segment 301 with Identifier 1.

FIG. 3B is a diagram illustrating an example of the data regarding an enhancement layer. In the present embodiment, the first generation unit 205 generates a segment 302 corresponding to data regarding an area of the entirety of an enhancement layer. In the present embodiment, the first generation unit 205 associates the segment 302 with Identifier 5.

In addition, the first generation unit 205 generates a segment 303 corresponding to a piece of the data regarding an enhancement layer regarding an area including a first object. The segment 303 is data corresponding to one or a plurality of image areas corresponding to a position of the first object in an image of one screen. In the present embodiment, the first generation unit 205 associates the segment 303 with Identifier 2.

In addition, the first generation unit 205 generates a segment 304 corresponding to a piece of the data regarding an enhancement layer regarding an area including a second object. The segment 304 is data corresponding to one or a plurality of image areas corresponding to a position of the second object in the image of one screen. In the present embodiment, the first generation unit 205 associates the segment 303 with Identifier 3.

Furthermore, the first generation unit 205 generates a segment 305 corresponding to a piece of the data regarding an enhancement layer regarding an area including a third object. The segment 305 is data corresponding to one or a plurality of image areas corresponding to a position of the third object in the image of one screen. In the present embodiment, the first generation unit 205 associates the segment 303 with Identifier 4.

The segment 302 is a segment including information indicating the objects detected by the detection unit 203, information indicating positions at which image areas have been divided by the division unit 202, and image data regarding the enhancement layer of the entirety of the one screen. In the example illustrated in FIG. 3B, the segment 302 includes information regarding positions at which the objects included in the one screen have been detected. Furthermore, in the example illustrated in FIG. 3B, the segment 302 includes information indicating positions of the image areas in the one screen obtained by dividing the enhancement layer into a plurality of areas using the division unit 202. The reception apparatus 102 can display solid rectangular lines surrounding the objects and the image areas obtained as a result of the division performed by the division unit 202 with broken lines, for example, by receiving data regarding the segment 302 from the transmission apparatus 101.

In the example illustrated in FIGS. 3A and 3B, the detection unit 203 detects three objects. As illustrated in FIG. 3B, the determination unit 204 determines whether each of the image areas obtained as a result of the division performed by the division unit 202 includes an object. The determination unit 204 identifies, among the image areas obtained as a result of the division performed by the division unit 202, image areas including objects. In the example illustrated in FIGS. 3A and 3B, image areas each including one object are identified.

The first generation unit 205 then generates segments on the basis of results of the determinations made by the determination unit 204. In the example illustrated in FIG. 3B, the first generation unit 205 determines data regarding four image areas including the first object (an object of the sun illustrated in FIG. 3B) to be data regarding the segment 303. In addition, the first generation unit 205 determines data regarding one image area including the second object (an object of a face illustrated in FIG. 3B) to be data regarding the segment 304. Furthermore, the first generation unit 205 two image areas including the third object (an object of a star illustrated in FIG. 3B) to be data regarding the segment 305.

As described above, in the present embodiment, a case in which the five segments 301 to 305 are generated will be taken as an example. The segment 301 is an image showing the entirety of an image area that is not divided into a plurality of image areas. The segment 302 is an image indicating for the user objects that are candidates for a ROI in image data and is an image of the entirety of an image area showing objects and positions at which the image area is divided. These segments 301 and 302 are not necessarily needed. By first displaying either the segment 301 or 302 on the reception apparatus 102, however, the user can easily select an object to be focused upon. This will be described in detail later with reference to FIG. 7.

FIGS. 4, 5, and 6 are diagrams illustrating examples of a playlist generated by the second generation unit 206.

In the present embodiment, a case will be taken as an example in which a playlist is generated in accordance with a method for describing a playlist called MPD (Media Presentation Description), which is specified in MPEG-DASH. A method for describing a playlist, however, is not limited to MPD, and a description method having functions equivalent to those of MPD, such as a method for describing a playlist in HTTP Livestreaming, may be used, instead. In addition, content other than that illustrated in FIGS. 4, 5, and 6 may be described with MPD.

A playlist 401 illustrated in FIG. 4 is an example of description according to MPD. URLs corresponding to the data regarding the segments 301 to 305 are described in BaseURL elements of Representation elements. As a result, distribution of data regarding segments in a period defined by Period becomes possible.

As illustrated in FIG. 4, the second generation unit 206 describes, in the playlist 401, identifiers of the segments and resource identifiers indicating addresses of the segments associated with each other. For example, an identifier <Representation id=3> of the segment 303 and a Base URL <Base URL>ObjectA.mp4</Base URL>, which is an address of the data regarding the segment 303, are associated with each other.

In the description method illustrated in FIG. 4, when the period defined by Period ends, the reception apparatus 102 needs to obtain a playlist described with MPD again in order to obtain data regarding segments in a next period.

A playlist 501 illustrated in FIG. 5 is an example of description according to MPD in which a mechanism called SegmentTemplate specified in MPEG-DASH is used. In the description method used for the playlist 501 illustrated in FIG. 5, the number of times of update of MPD is smaller than in the description method used for the playlist 401 illustrated in FIG. 4.

In the playlist 501, a template of the URLs indicating addresses of the segments 301 to 305 can be declared by a media attribute of a SegmentTemplate element.

By replacing $Representation$ in the template with id attributes of Representations, the URLs can be specified without describing a URL for each Representation as in the playlist 401.

Furthermore, by incrementing $Number$ from 1 to 2, and then to 3, the reception apparatus 102 can access the segments 301 to 305, which change in a time axis direction, without updating MPD. The description method illustrated in FIG. 5, however, does not assume a case in which the number of objects detected by the detection unit 203 increases. For example, assume that the detection unit 203 has detected a fourth object from the image data. In this case, the reception apparatus 102 cannot obtain, from information described in the playlist 501, a URL for accessing a segment whose ROI is the fourth object. The playlist described with MPD, therefore, needs to be updated again.

A playlist 601 illustrated in FIG. 6 is an example of description according to MPD in which a template called $ObjectID$ is introduced to the specification of MPEG-DASH.

In the playlist 601, when the number of objects included in the image data increases, ObjectID increments from 1 to 2, and then to 3 by replacing $ObjectID$ with an identification number of each object. As a result, the reception apparatus 102 can access a segment whose ROI is each object without newly obtaining the playlist 601 described with MPD.

When the playlist 601 illustrated in FIG. 6 is used, the transmission apparatus 101 can perform the following process if the reception apparatus 102 accesses a URL of data regarding a segment whose ROI is an object that has disappeared from image data. First, the transmission apparatus 101 can send back to the reception apparatus 102 a response indicating that the object no longer exists. In addition, the transmission apparatus 101 can transmit the data regarding the segment 301 or 302 to the reception apparatus 102 instead of the data regarding the segment whose ROI is the object that has disappeared from the image data. By transmitting the data regarding the segment 301 or 302 to the reception apparatus 102, the reception apparatus 102 displays the data regarding the segment 301 or 302 to prompt the user to specify a next ROI.

Figure 7:
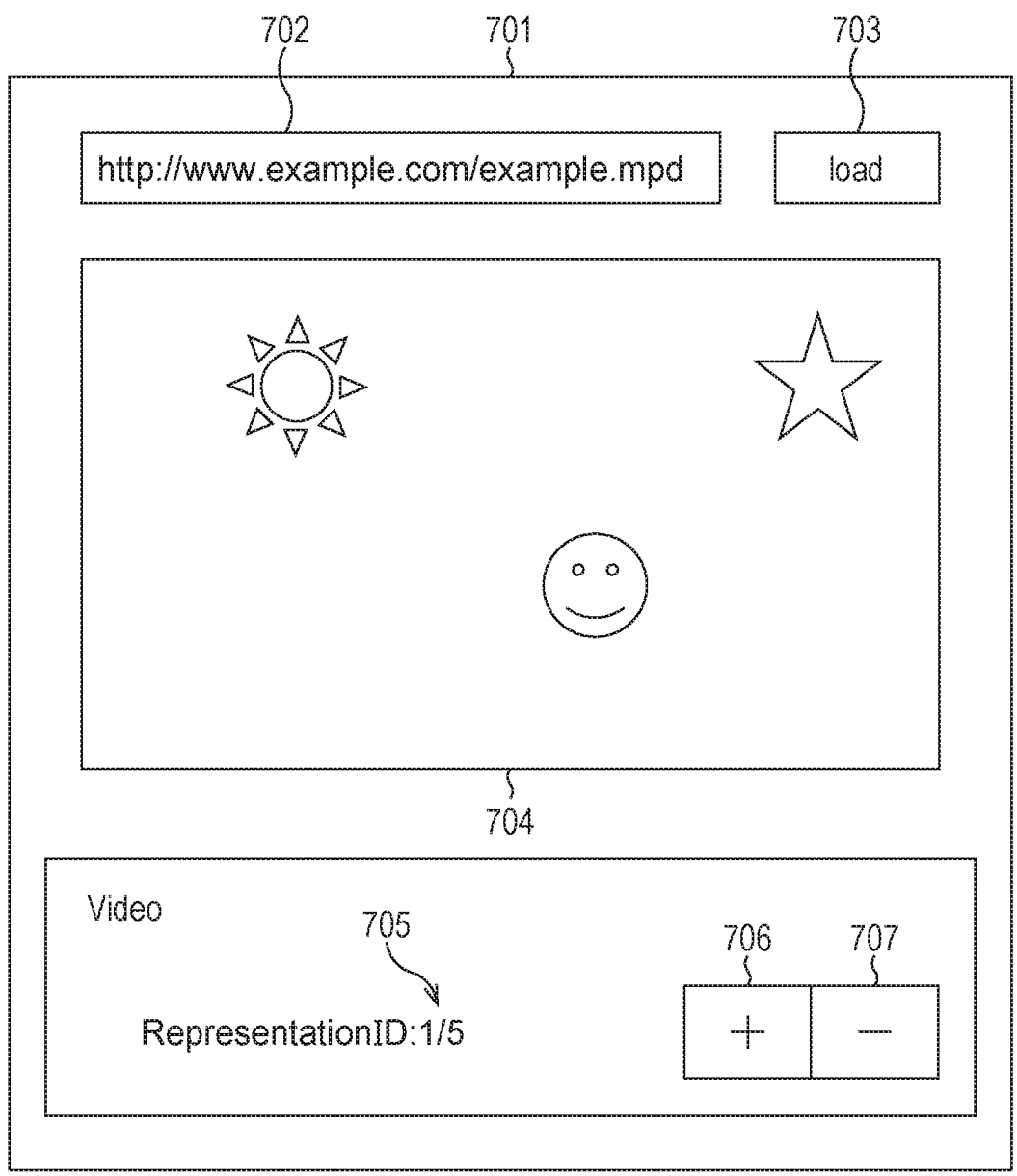
FIG. 7 is a diagram illustrating a user interface displaying image data.

FIG. 7 is a diagram illustrating an example of a user interface displaying image data received by the reception apparatus 102. The reception apparatus 102 includes the user interface illustrated in FIG. 7.

On a screen 701, a URL input field 702 for obtaining MPD and a button 703 are displayed. The user inputs a URL of MPD to the input field 702 and presses the button 703. As a result, the reception apparatus 102 begins to obtain a playlist described with MPD for the URL input to the input field 702.

Alternatively, the transmission apparatus 101 may transmit a URL indicating an address of a playlist to the reception apparatus 102 in advance. Alternatively, the reception apparatus 102 may store a URL indicating an address of a playlist as a default.

Upon obtaining a playlist described with MPD, the reception apparatus 102 selects a desired one of segments described in the playlist. The reception apparatus 102 then accesses a URL, which is an address of the selected segment, obtains data regarding the segment, and displays the data regarding the segment on a screen 704.

For example, the reception apparatus 102 obtains the data regarding the segment 301 for the entirety of the image area and the data regarding the segment 303. The reception apparatus 102 then decodes the obtained data regarding the segments and displays, on the screen 704, an image obtained by combining the data regarding the segment 301 for the entirety of the image area (data regarding a base layer) with the data regarding the segment 303 (data regarding an enhancement layer). As a result, an area (Areas 1, 2, 5, and 6 illustrated in FIG. 8) in which the data regarding the segment 303 is displayed is displayed with higher image quality than the other areas.

In an area 705, the number of Representations (denominator) described in the playlist and a Representation number (numerator) of a currently obtained segment are displayed. If the user presses a button 706 or 707, the Representation number increases or decreases. The reception apparatus 102 identifies, from the playlist, a URL indicating an address of a segment corresponding to a new Representation number and accesses the address of the segment. The reception apparatus 102 then obtains data regarding the segment and displays the data regarding the segment on the screen 704.

For example, assume that the reception apparatus 102 has obtained and displayed the segment 301 for the entirety of the image area (data regarding a base layer) and the segment 303 (data regarding an enhancement layer in four upper-left areas). In this state, in order to make a request to switch a region of interest to Area 11 (refer to FIG. 8), which includes the segment 304, the user presses the button 706 or 707 to specify a Representation number "4". Here, a Representation number corresponds to a Representation id illustrated in FIG. 4 and the like. As a result, the reception apparatus 102 accesses the Base URL of the segment 304 and obtains the data regarding the segment 304 (data regarding an enhancement layer corresponding to Area 11 illustrated in FIG. 8). The reception apparatus 102 then displays, on the screen 704, an image obtained by combining the data regarding the segment 301 for the entirety of the image area (data regarding a base layer) with the data regarding the segment 304. At this time, the data regarding the segment 303 before the switching is not combined with the data regarding the segment 301 for the entirety of the image area. An area (Area 11 illustrated in FIG. 8) in which the data regarding the segment 304 is displayed is thus displayed with higher image quality than the other areas.

In the present embodiment, the user can switch an object to be focused upon in the above-described manner.

Figure 8:
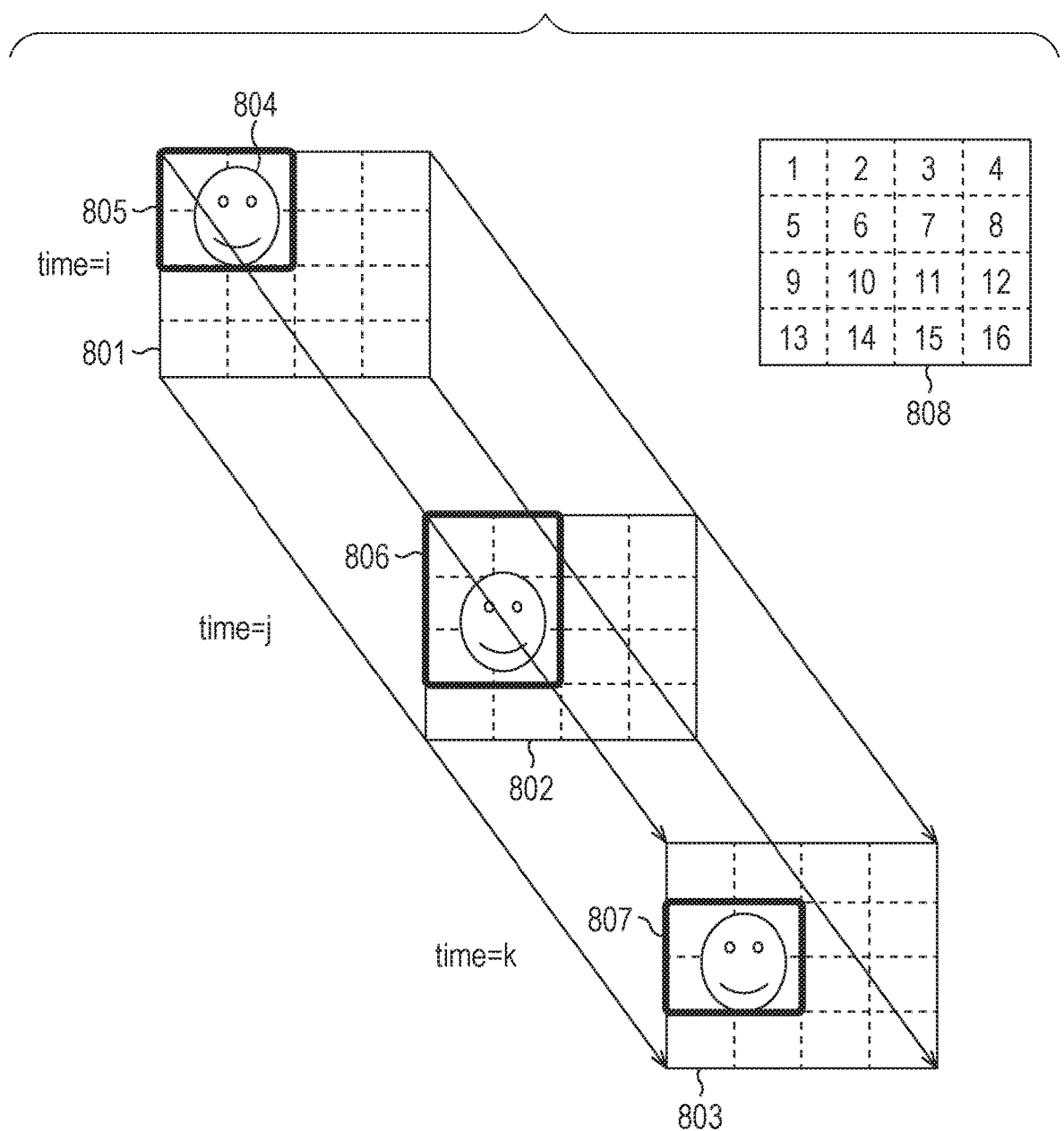
FIG. 8 is a diagram conceptually illustrating a segment.

FIG. 8 is a diagram conceptually illustrating an example of a segment generated by the first generation unit 205.

In the example illustrated in FIG. 8, the division unit 202 divides an image 808 into 16 image areas.

Images 801 to 803 are images at times i, j, and k, respectively. Time passes in order of the times i, j, and k. An image area including an object 804 in an image changes from an image area 805 to an image area 806, and then to an image area 807 over time. Before the time i, the image area including the object 804 is Areas 1, 2, 5, and 8 included in the image 808. In addition, in a period between the times i and j, the image area including the object 804 is Areas 1, 2, 5, 6, 9, and 10. Furthermore, in a period between the times j and k, the image area including the object 804 is Areas 5, 6, 9, and 10.

If the reception apparatus 102 requests the transmission apparatus 101 to obtain data regarding a segment for the object 804 at one of the times i, j, and k, the transmission apparatus 101 needs to transmit data regarding a segment of one of the above-mentioned image areas corresponding to the time.

Figure 9:
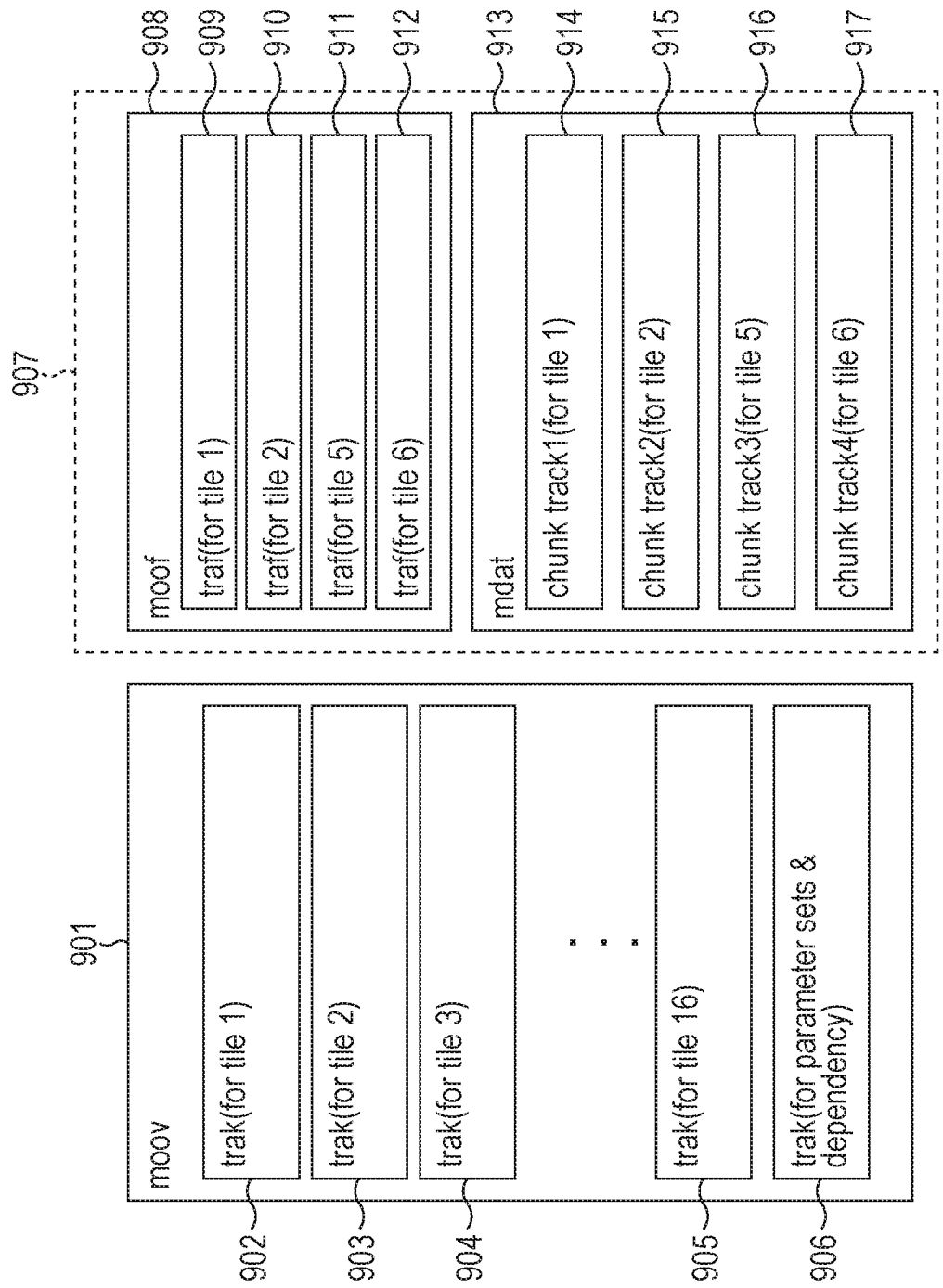
FIG. 9 is a diagram illustrating a specific example of segments.

FIG. 9 is a diagram illustrating a specific example of segments generated by the first generation unit 205.

In the present embodiment, a case will be taken as an example in which a file format of segments is ISO BMFF, which is adopted as a standard in MPEG-DASH. A file format of segments, however, is not limited to ISO BMFF, but may be MPEG2 TS, WebM, or the like, instead. In addition, although a plurality of methods for generating segments using ISO BMFF are proposed in MPEG-DASH, a method in which an Initialization segment and a Media segment are generated as separate files will be taken as an example in the present embodiment. A method for generating segments using ISO BMFF is not limited to this method, but may be another method specified in MPEG-DASH, instead.

Segments include an Initialization segment 901 and a Media segment 907.

The Initialization segment 901 is a segment including a moon box storing common initialization information necessary to decode the subsequent Media segment 907.

Trak boxes 902 to 905 include meta-information regarding image data in image areas.

A trak box 906 includes information regarding parameter sets and information regarding dependency of tracks as common information between the tracks. By collecting the common information between the tracks in the trak box 906, the some information is not redundantly stored in each track.

The Media segment 907 corresponds to a segment including the object 804 before the time i illustrated in FIG. 8. A moof box 908 stores header information regarding the image data.

Information in traf boxes 909, 910, 911, and 912 indicates that these boxes include the image data regarding Areas 1, 2, 5, and 6, respectively, indicated in the image 808 illustrated in FIG. 8. The image data regarding Areas 1, 2, 5, and 6 included in the image 808 illustrated in FIG. 8 is stored in chunk tracks 914, 915, 916, and 917, respectively, in an mdat box 913.

Figure 10:
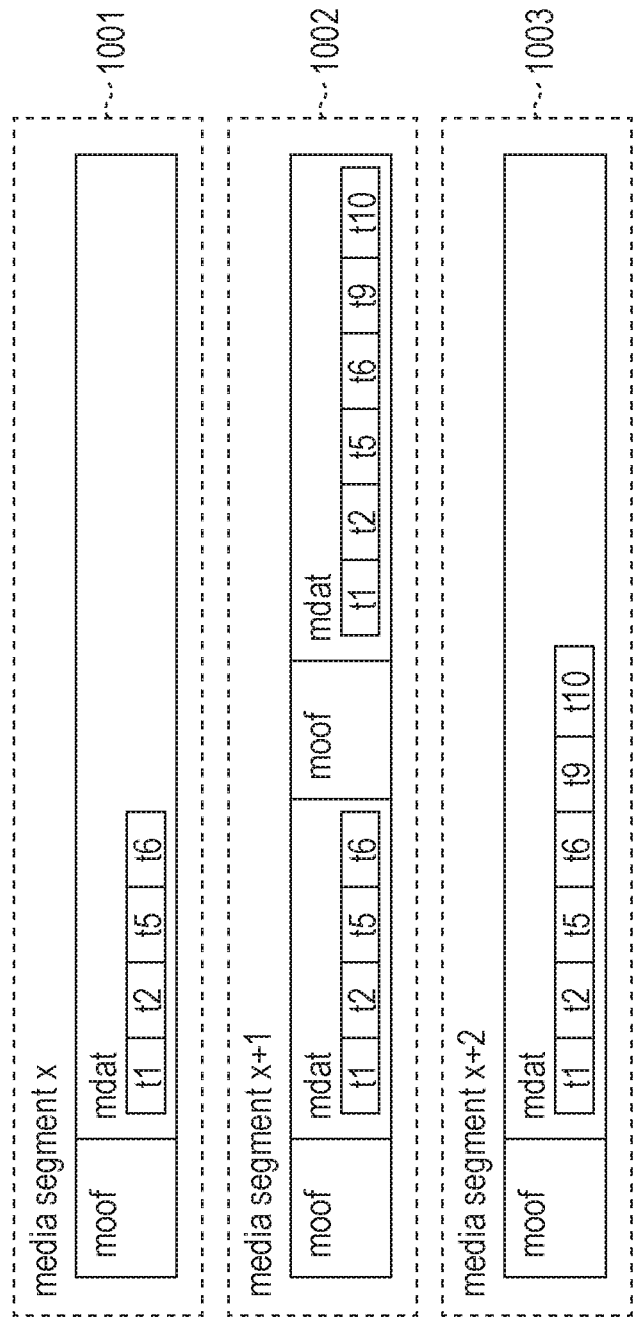
FIG. 10 is a diagram illustrating a method for generating segments.

FIG. 10 is a diagram illustrating an example of a method for generating segments at times when the image area including the object 804 switches.

As described above, before the time i, the object 804 is included in the image area 805 consisting of Areas 1, 2, 5, and 6. A Media segment 1001, therefore, includes the data regarding Areas 1, 2, 5, and 6. Around the time i, the image area including the object 804 switches to the image area 806 consisting of Areas 1, 2, 5, 6, 9, and 10. At this time, as in a Media segment 1002, the configuration of data in an mdat box can be switched by inserting a moof box into the segment. In doing so, the configuration of the image can be switched while keeping the segment length of Media segments 1001 to 1003 the same. Alternatively, unlike the Media segment 1002, a Media segment may be divided at a moof box.

Figure 11:
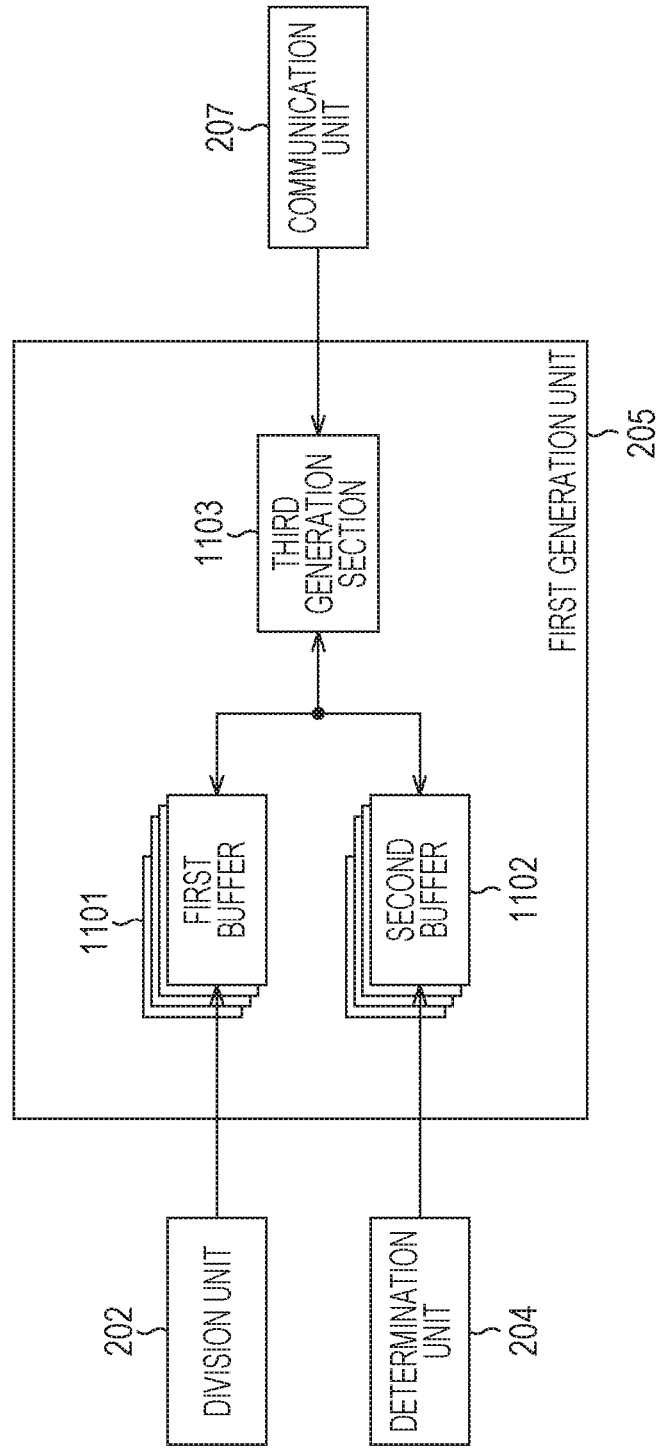
FIG. 11 is a diagram illustrating the detailed functional configuration of a first generation unit.

FIG. 11 is a diagram illustrating an example of the detailed functional configuration of the first generation unit 205.

Image data in image areas obtained by division performed by the division unit 202 is buffered in a first buffer 1101. In addition, information regarding an image area output from the determination unit 204 and including an object is buffered in a second buffer 1102.

A period for which the image data and the information are buffered in the first buffer 1101 and the second buffer 1102, respectively, is a period for which segments can be distributed, and determined by a TimeShiftBufferDepth attribute in MPEG-DASH.

A third generation section 1103 determines, on the basis of a request input from the communication unit 207, which object's image data at which time is being requested.

The third generation section 1103 identifies, on the basis of the information buffered in the second buffer 1102, which image area the determined object exists in at the determined time. The third generation section 1103 then obtains, from the first buffer 1101, image data regarding the image area in which the determined object exists at the determined time.

The third generation section 1103 generates one of the Media segments illustrated in FIG. 10 using the obtained image data, the information regarding the image areas of the image data, and the information regarding a time of the image data. In doing so, if the reception apparatus 102 requests the transmission apparatus 101 to obtain a certain object shown in the image data, the transmission apparatus 101 can create a Media segment for the requested object. A load upon the transmission apparatus 101, therefore, can be reduced. It is to be noted that a Media segment need not necessarily be created each time the reception apparatus 102 makes a request. For example, the transmission apparatus 101 may generate Media segments for all objects shown in an image before receiving a request from the reception apparatus 102.

As described above, in the present embodiment, the transmission apparatus 101 divides image data into a plurality of image areas, detects one or a plurality of objects included in the image data, and identifies image areas including the one or plurality of objects detected. Next, the transmission apparatus 101 generates a segment for each of the identified image areas and a playlist in which URLs for accessing the segments are described. Next, the transmission apparatus 101 transmits the playlist in accordance with a request from the reception apparatus 102 and then, after a URL included in the playlist is accessed, transmits data regarding a segment whose address is indicated by the URL to the reception apparatus 102.

The reception apparatus 102, therefore, can obtain a playlist and data regarding a segment on the basis of a URL included in the obtained playlist. The reception apparatus, therefore, can efficiently display an image of a region of interest (ROI) in image data selected by the user without performing a special process.

In addition, in the present embodiment, a segment of the entirety of an image area, a segment of the entirety of the image area indicating objects and positions at which the image data is divided, and URLs for accessing the segments are included in a playlist. By displaying data regarding the segments of the entirety of the image area before displaying data regarding the above-described segments of individual image areas, therefore, the user can easily select a ROI. In addition, by displaying the data regarding the segments of the entirety of the image area when an object requested from the reception apparatus 102 is not included in the image data, the user can easily select a ROI again.

Next, the operation of the transmission apparatus 101 according to the present embodiment will be described with reference to FIG. 11. In a mode in which the transmission apparatus 101 includes a processor and a memory, a process illustrated in FIG. 11 is achieved by expanding a program of a procedure illustrated in FIG. 11 stored in the holding unit 208 to the memory and executing the program. Alternatively, a part or the entirety of the process illustrated in FIG. 11 may be performed by hardware.

The division unit 202 generates data regarding a base layer on the basis of an image included in image data obtained from the image capture unit 201 (S1101).

In addition, the division unit 202 generates data regarding an enhancement layer on the basis of the image included in the image data obtained from the image capture unit 201 (S1102). The order of the processing in step S1101 and the processing in step S1102 is not particularly limited, and may be switched.

Next, the division unit 202 divides the generated enhancement layer into a plurality of image areas.

For example, as indicated by 808 in FIG. 8, the division unit 202 divides the data regarding the enhancement layer into Image Areas 1 to 16 (S1103).

Next, the first generation unit 205 generates the segment 301 corresponding to the data regarding the base layer (S1104).

Next, the first generation unit 205 generates the segment 302 corresponding to the entirety of the enhancement layer (S1105).

Next, the first generation unit 205 generates the segments 303 to 305 of the image areas of the enhancement layer (S1106).

Next, the holding unit 208 holds data regarding the segments 301 to 305 generated by the first generation unit 205 (S1107).

Next, the second generation unit 206 generates a playlist in which addresses of the segments 301 to 305 held by the holding unit 208 are described (S1108).

Next, the communication unit 207 receives a playlist request from the reception apparatus 102 (S1109). Next, the communication unit 207 transmits the playlist generated by the second generation unit to the reception apparatus 102 in response to the received playlist request (S1110).

Next, the communication unit 207 receives, from the reception apparatus 102, a reception request of one of the plurality of segments described in the playlist selected by the reception apparatus 102 (S1111).

Next, the communication unit 207 reads data regarding the requested segment from the holding unit 208 in response to the reception request of the segment from the reception apparatus 102 and transmits the data to the reception apparatus 102 (S1112).

As a result of the above process, the transmission apparatus 101 can transmit image data to the reception apparatus 102.

Figure 12:
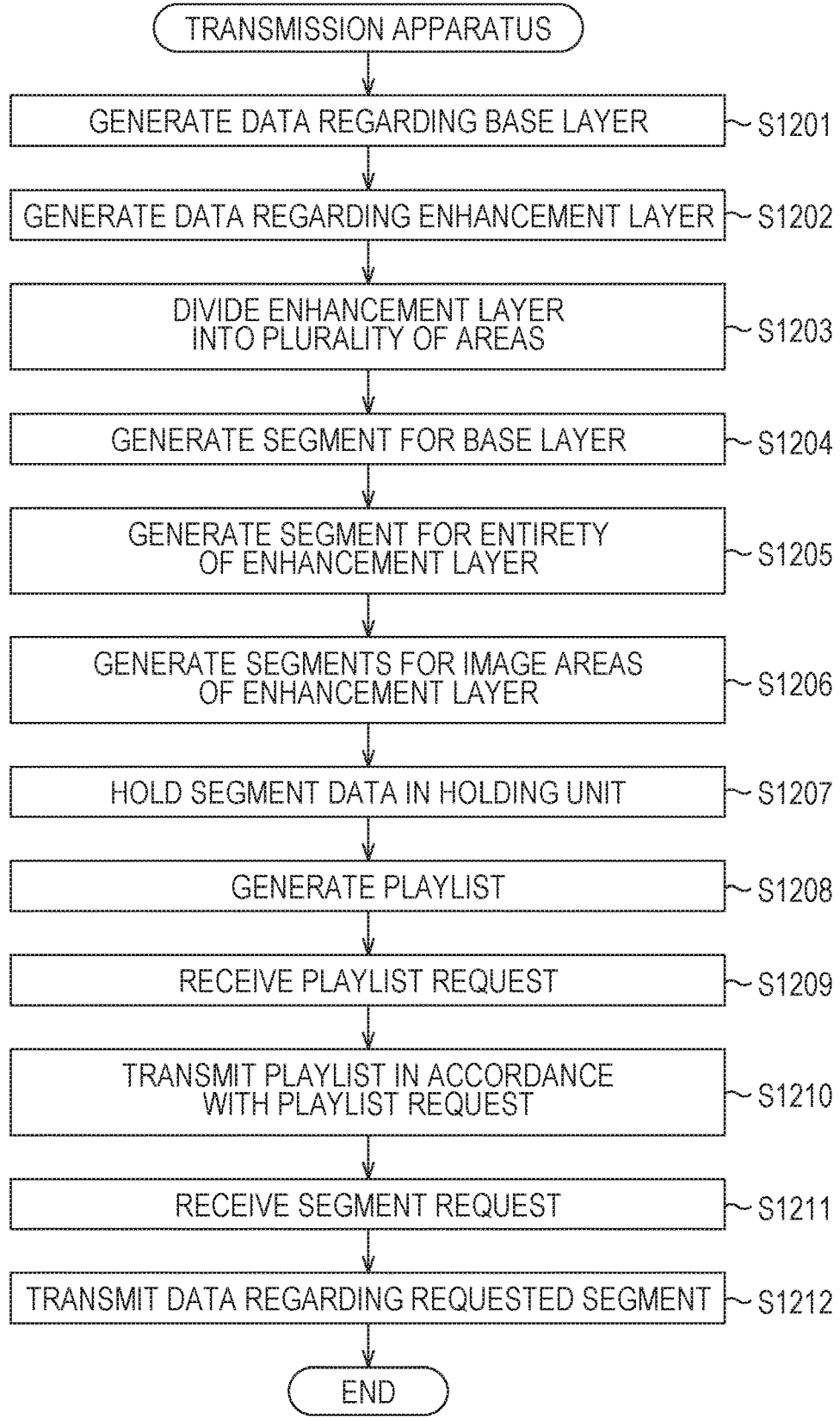
FIG. 12 is a flowchart illustrating the operation of the transmission apparatus.

Next, an example of the operation of the transmission apparatus 101 according to the present embodiment will be described with reference to FIG. 12. In a mode in which the transmission apparatus 101 includes a processor and a memory, a process illustrated in FIG. 12 is achieved by expanding a program of a procedure illustrated in FIG. 12 stored in the holding unit 208 to the memory and executing the program. Alternatively, a part or the entirety of the process illustrated in FIG. 12 may be performed by hardware.

The division unit 202 generates data regarding a base layer on the basis of an image included in image data obtained from the image capture unit 201 (S1201).

In addition, the division unit 202 generates data regarding an enhancement layer on the basis of the image included in the image data obtained from the image capture unit 201 (S1202). The order of the processing in step S1201 and the processing in step S1202 is not particularly limited, and may be switched.

Next, the division unit 202 divides the generated enhancement layer into a plurality of image areas. For example, as indicated by 808 in FIG. 8, the division unit 202 divides the data regarding the enhancement layer into Image Areas 1 to 16 (S1203).

Next, the first generation unit 205 generates the segment 301 corresponding to the data regarding the base layer (S1204).

Next, the first generation unit 205 generates the segment 302 corresponding to the entirety of the enhancement layer (S1205).

Next, the first generation unit 205 generates the segments 303 to 305 of the image areas of the enhancement layer (S1206).

Next, the holding unit 208 holds data regarding the segments 301 to 305 generated by the first generation unit 205 (S1207).

Next, the second generation unit 206 generates a playlist in which addresses of the segments 301 to 305 held by the holding unit 208 are described (S1208).

Next, the communication unit 207 receives a playlist request from the reception apparatus 102 (S1209). Next, the communication unit 207 transmits the playlist generated by the second generation unit to the reception apparatus 102 in response to the received playlist request (S1210).

Next, the communication unit 207 receives, from the reception apparatus 102, a reception request of one of a plurality of segments described in the playlist selected by the reception apparatus 102 (S1211). Next, the communication unit 207 reads data regarding the requested segment from the holding unit 208 in response to the reception request of the segment from the reception apparatus 102 and transmits the data to the reception apparatus 102 (S1212).

As a result of the above process, the transmission apparatus 101 can transmit image data to the reception apparatus 102.

Figure 13:
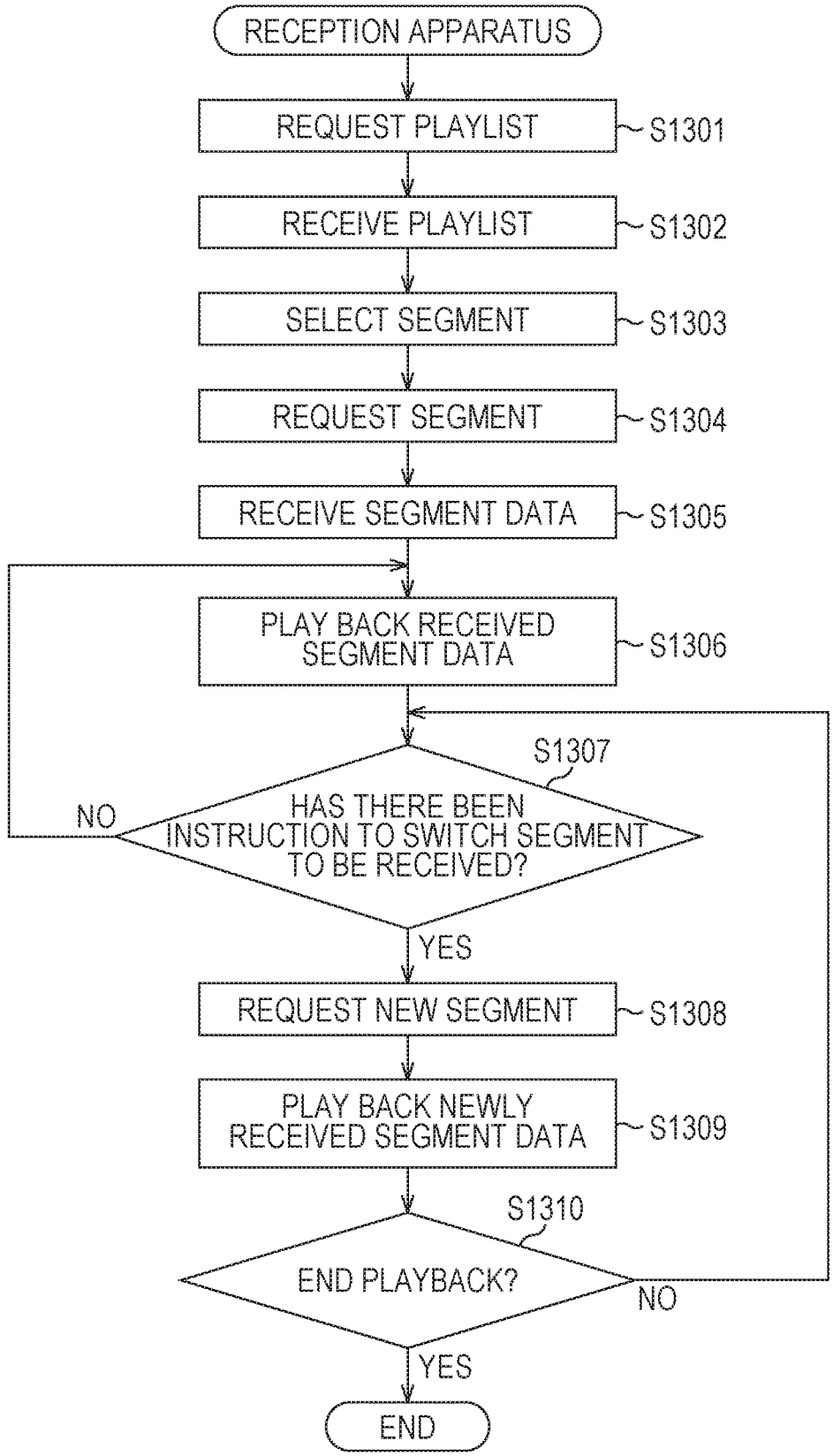
FIG. 13 is a flowchart illustrating the operation of a reception apparatus.

Next, an example of the operation of the reception apparatus 102 according to the present embodiment will be described with reference to FIG. 13. In a mode in which the reception apparatus 102 includes a processor and a memory, a process illustrated in FIG. 13 is achieved by expanding a program of a procedure illustrated in FIG. 13 stored in a holding unit of the reception apparatus 102 to the memory and executing the program. Alternatively, a part or the entirety of the process illustrated in FIG. 13 may be performed by hardware.

A communication unit of the reception apparatus 102 requests the reception apparatus 102 to transmit a playlist (S1301). Next, the communication unit of the reception apparatus 102 receives the playlist from the transmission apparatus 101 (S1302).

Next, the reception apparatus 102 selects a desired one of segments whose addresses are described in the playlist (S1303). A segment can be selected on the basis of a user operation performed on the reception apparatus 102. Alternatively, a segment may be selected on the basis of a selection criterion preset in the reception apparatus 102.

Next, the reception apparatus 102 receives data regarding the requested segment from the reception apparatus 102 (S1305).

Next, the reception apparatus 102 plays back the received segment data to display the segment data on a display unit of the reception apparatus 102 (S1306).

Next, the reception apparatus 102 determines whether there has been an instruction to switch a segment to be received from the transmission apparatus 101 (S1307). The switching request is, for example, input to the reception apparatus 102 when the user operates the button 706 or 707 illustrated in FIG. 7.

If there has been no switching instruction (NO in S1307), the operation returns to the processing in step S1306. If a switching instruction is input, on the other hand, the reception apparatus 102 requests data regarding a segment newly selected in accordance with the switching instruction from the transmission apparatus 101 (S1308). Next, the reception apparatus 102 receives the segment data transmitted from the transmission apparatus 101 in accordance with the new segment request and plays back the segment data to display the segment data on the display unit (S1309).

Next, the reception apparatus 102 determines whether to end the playback of the data transmitted from the transmission apparatus 101 (S1310). If the playback of the data is to be continued (NO in S1310), the operation returns to the processing in step S1307. If the playback of the data is to be ended (YES in S1210), on the other hand, the playback process ends.

The reception apparatus 102 can thus select and receive desired one of pieces of segment data held by the transmission apparatus 101.

In the present embodiment, a case has been described as an example in which the communication unit 207 performs streaming distribution of data regarding a segment generated by the first generation unit 205. The streaming distribution of a moving image, however, need not necessarily be performed. For example, the method described in the present embodiment can be applied when the reception apparatus 102 obtains moving image data generated or recorded by the transmission apparatus 101 in the past as necessary.

In addition, a target of distribution is not limited to a moving image, but may be a still image, instead. For example, a playlist in which an URL for accessing the entirety of a still image is described and a playlist in which a URL for accessing an image area of the still image including a certain object is described may be generated and transmitted.

All the above-described embodiments are just specific examples in which the present invention is implemented, and these embodiments shall not be seen to be limiting the technical scope of the present invention. That is, the present invention may be implemented in various ways without deviating from the technical idea or principal characteristics thereof.

Other Embodiments

The present invention can be achieved by a process in which a program that achieves one or more functions according to the above-described embodiment is supplied to a system or an apparatus through a network or a storage medium and one or more processors of a computer of the system or the apparatus reads and executes the program. In addition, the present invention can be achieved by a circuit (e.g., an ASIC) that achieves one or more functions.

The present invention is not limited to the above embodiments and can be modified and altered in various ways without deviating from the spirit and scope thereof. The following claims, therefore, are attached in order to make public the scope of the present invention.

According to the present invention, a reception apparatus is enabled to request an area according to a position of an object when an image is communicated using a playlist.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
   one or more processors; and
   one or more memories which store instructions executable by the one or more processors to cause the communication apparatus to:
   generate a playlist including one piece of obtaining information used by a reception apparatus to obtain, in a case where a position of an object moves from a first partial area of an image to a second partial area of the image within a period specified in accordance with a Period set forth in MPEG-DASH, both of a video segment in the first partial area and a video segment in the second partial area, wherein the one piece of obtaining information is associated with the object, and the object is able to be specified by the reception apparatus;
   transmit the playlist generated to the reception apparatus; and
   provide the video segments of the first and second partial areas to the reception apparatus in accordance with a request from the reception apparatus that has specified the object.

2. The communication apparatus according to claim 1, wherein an identifier of the object and information regarding a URL for requesting the video segments of the first and second partial areas according to the position of the object are associated with each other and described in the playlist.

3. The communication apparatus according to claim 1,
   wherein generating a playlist in which a first URL for requesting a video segment of a first area based on the position of a first object in the video segment and a second URL for obtaining a video segment of a second area based on the position of a second object in the video segment are described, and
   wherein transmitting, to the reception apparatus, a video segment of an area according to a URL corresponding to a request from the reception apparatus that has obtained the playlist.

4. The communication apparatus according to claim 1, further comprising:
   divide the video segment by a certain area size,
   wherein the area based on the position of the object includes one or more partial areas obtained as a result of the division performed.

5. The communication apparatus according to claim 1, further comprising:
  obtain a video segment of first image quality and a video segment of second image quality, which is higher than the first image quality, from the video segment,
  wherein generating a playlist used by the reception apparatus to request the video segment of the first image quality and the video segment of the second image quality.

6. The communication apparatus according to claim 1, wherein, if, among a plurality of objects in a video segment corresponding to a first time, a first object specified by the reception apparatus that has obtained the playlist does not exist in a video segment corresponding to a second time, which comes after the first time, transmitting a video segment of an area based on a position of a second object in the video segment corresponding to the second time to the reception apparatus.

7. The communication apparatus according to claim 1, further comprising:
  detect an object from the video segment.

8. A communication method comprising:
  generating a playlist including one piece of obtaining information used by a reception apparatus to obtain, in a case where a position of an object moves from a first partial area of an image to a second partial area of the image within a period specified in accordance with a Period set forth in MPEG-DASH, both of a video segment in the first partial area and a video segment in the second partial area, wherein the one piece of obtaining information is associated with the object, and the object is able to be specified by the reception apparatus;
  transmitting the playlist generated to the reception apparatus; and
  providing the video segments of the first and second partial areas to the reception apparatus in accordance with a request from the reception apparatus that has specified the object.

9. The communication method according to claim 8,
  wherein an identifier of the object and information regarding a URL for requesting the video segments of the first and second partial areas according to the position of the object are associated with each other and described in the playlist.

10. The communication method according to claim 8,
  wherein generating a playlist in which a first URL for requesting a video segment of a first area based on the position of a first object in the video segment and a second URL for obtaining a video segment of a second area based on the position of a second object in the video segment are described, and
  wherein transmitting, to the reception apparatus, a video segment of an area according to a URL corresponding to a request from the reception apparatus that has obtained the playlist.

11. A non-transitory computer-readable storage medium storing a program for causing a computer to execute a communication method for a communication apparatus, the communication method comprising:
  generating a playlist including one piece of obtaining information used by a reception apparatus to obtain, in a case where a position of an object moves from a first partial area of an image to a second partial area of the image within a period specified in accordance with a Period set forth in MPEG-DASH, both of a video segment in the first partial area and a video segment in the second partial area, wherein the one piece of obtaining information is associated with the object, and the object is able to be specified by the reception apparatus;
  transmitting the playlist generated to the reception apparatus; and
  providing the video segments of the first and second partial areas to the reception apparatus in accordance with a request from the reception apparatus that has specified the object.

* * * * *